US006992481B2

(12) United States Patent
Stotz

(10) Patent No.: US 6,992,481 B2
(45) Date of Patent: Jan. 31, 2006

(54) METHOD FOR COMPENSATING FOR PREDICTABLE GENERATED SIGNALS IN AN ELECTRONIC DEVICE

(75) Inventor: Gerhard Stotz, Eisingen (DE)

(73) Assignee: Timex Group B. V., (NL)

( * ) Notice: Subject to any disclaimer, the term of this patent is extended or adjusted under 35 U.S.C. 154(b) by 0 days.

(21) Appl. No.: 10/737,387

(22) Filed: Dec. 16, 2003

(65) Prior Publication Data

US 2004/0237319 A1 Dec. 2, 2004

Related U.S. Application Data

(60) Provisional application No. 60/474,165, filed on May 29, 2003.

(51) Int. Cl.
*G01R 33/00* (2006.01)
*G01B 7/30* (2006.01)
*G04B 47/06* (2006.01)

(52) U.S. Cl. .................... 324/232; 324/207.25; 368/11

(58) Field of Classification Search ................ 324/772, 324/207.25, 144, 232; 33/272, 354, 361, 33/326; 368/10, 71, 88, 226, 11
See application file for complete search history.

(56) References Cited

U.S. PATENT DOCUMENTS 5,596,551 A 1/1997 Born et al. .................... 368/10
5,691,962 A 11/1997 Schwartz et al. ............. 368/71
5,721,713 A * 2/1998 Bornand ...................... 368/10
5,883,861 A * 3/1999 Moser et al. ................. 368/10
6,385,133 B1 * 5/2002 Miyauchi ..................... 368/10
6,429,651 B1 * 8/2002 Choi et al. .................. 324/249
6,817,106 B2 * 11/2004 Kato ........................ 33/355 R

FOREIGN PATENT DOCUMENTS

| | | | |
|---|---|---|---|
| CH | 690697 | A5 | 12/2000 |
| EP | 1024345 | A1 | 8/2000 |
| EP | 1178284 | A2 | 2/2002 |
| FR | 2438861 | | 5/1980 |
| JP | 10170664 | | 6/1998 |
| WO | 01/91978 | A2 | 12/2001 |

* cited by examiner

*Primary Examiner*—Vincent Q. Nguyen
*Assistant Examiner*—Jeff Natalini
(74) *Attorney, Agent, or Firm*—Carmody & Torrance LLP

(57) ABSTRACT

In an electronic device, a method of measuring an external field and displaying indicia related to the measurement, wherein the electronic device generates a first internal field and at least a second internal field, wherein the method includes the steps of measuring the external field when the electronic device is generating the first internal field; and only displaying indicia related to measurements taken while the electronic device is generating the first internal field. In the preferred embodiment, the first internal field is generated by a rotor of a stepping motor being in a first orientation, and the at least second internal field is generated by the rotor of the stepping motor being in a second orientation, wherein the method includes the steps of determining whether the rotor is in the first orientation before measuring the external field; and if not, causing the rotor to rotate into the first orientation prior to measuring the external field.

14 Claims, 3 Drawing Sheets

METHOD FOR COMPENSATING FOR PREDICTABLE GENERATED SIGNALS IN AN ELECTRONIC DEVICE

RELATED U.S. APPLICATION DATA

This application claims the benefit of U.S. Provisional Application No. 60/474,165 filed on May 29, 2003.

BACKGROUND OF THE INVENTION

The present invention is generally directed to electronic devices that produce or encounter predictable and/or internally generated signals, and in particular, to an improved method of more accurately compensating for such predictable and/or internally generated signals. Specifically, by way of example, the present invention is directed to electronic devices that include a "compass mode" in which the device can receive and display directional headings. More specifically, the present invention is directed to a method of more accurately determining directional headings in such an electronic device such as a timepiece, and a watch in particular, that includes one or more stepper motors, such as a Lavet stepping motor, which have the capability to produce magnetic fields which, if not accurately compensated for while the electronic device is in the "compass mode," can significant affect the directional heading readings.

Typically, "all digital" watches do not include any internally generated electromagnetic (i.e. electric and/or magnetic) fields. For example, such watches typically do not include any stepper motors, and use only LCD displays for the display of all information, including the "time of day" ("TOD"). More specifically, those "all digital" watches that do include a compass mode can obtain fairly accurate directional heading readings because there is typically no internally changing magnetic fields, such as those created by the rotors of such stepper motor being in different orientations, to interfere with such readings.

However, not all consumers prefer such "all digital" watches, and instead, prefer watches with some amount of analog display functionality, i.e. watches which tell time or other information using hands. In watches that drive such hands by the use of stepper motors, attention needs to be made to the magnetic fields caused by the rotor which may adversely affect the directional heading readings, since practically speaking, the duration of the time period during which directional heading readings are obtained will include the period where the rotor would typically passes through both orientations (e.g. 180° apart).

Therefore, in watches that are "all analog" or which may include functions of both an analog watch and digital watch, such as the "combo" watch, an example of which is described in U.S. Pat. No. 5,691,962 the subject matter of which is incorporated by reference as if fully set forth herein, it is desirable to take into account the orientation of the rotor when taking directional heading readings.

In the marketplace, there is at least one watch that includes both hands for telling time (i.e. an analog watch) and a compass mode, such watch being marketed and sold under the brand name Tissot T-Touch. Contrary to the construction provided in the instant application, the Tissot T-Touch uses the hour and minute hand to indicate the direction. That is, during the normal time telling mode, the Tissot T-Touch tells time in the traditional manner (i.e. with its hour and minute hands). However, upon the activation of the compass mode, the hour and minute hand become aligned to act as a compass direction indicator (i.e. pointing North). Whether or not the internal methodology in the Tissot T-Touch takes into account the possibility of changing magnetic fields created in the watch during directional heading readings (i.e. it is noted that the rotor must be rotating to permit the hands to continually rotate) so as to provide for increased accuracy in its directional heading readings, it will become quite apparent that the present invention is directed to a starkly different methodology.

Thus, it has been recognized that advances in the methodology to compensate for predictable and/or internally generated signals in electronic devices are desired. Specifically, by way of example, it is desired to provide an improved methodology for compensating for the magnetic fields created by the one or more rotors of a stepper motor in an electronic device. In particular, it is desirable to provide an improved method of more accurately determining directional headings in an electronic device that includes a sensor for taking such readings, such as a timepiece, and a watch in particular, that includes one or more stepper motors. The present invention overcomes the perceived deficiencies in the prior art as well as achieves the foregoing and below mentioned objectives.

SUMMARY AND OBJECTS OF THE INVENTION

It is therefore an object of the present invention to provide a method for compensating for predictable and/or internally generated signals in electronic devices.

It is another object and advantage of the present invention to provide an improved methodology for compensating for the magnetic fields created by the one or more rotors of a stepper motor in an electronic device.

It is yet another object of the present invention to provide an improved method of more accurately determining directional headings in an electronic device such as a timepiece, and a watch in particular, that includes one or more stepper motors and which includes a "compass mode" that takes and displays such directional headings.

Another object and advantage of the present invention is to provide an electronic device that can more accurately take such directional heading readings and display them to a user, such as on an LCD display.

Still another object and advantage of the present invention is to provide and display such directional heading readings while continuously maintaining and displaying at least essentially accurate timekeeping information.

Still other objects and advantages of the invention will in part be obvious and will in part be apparent from the specification.

The invention accordingly comprises the features of construction, combination of elements and arrangement of parts and sequence of steps which will be exemplified in the construction, illustration and description hereinafter set forth, and the scope of the invention will be indicated in the claims.

Generally speaking, the invention is directed to a method, in an electronic device, of measuring an external field and displaying indicia related to the measurement, wherein the electronic device generates a first internal field and at least a second internal field, wherein the method comprises the steps of measuring the external field when the electronic device is generating the first internal field; and only displaying indicia related to measurements taken while the electronic device is generating the first internal field, although when the displaying occurs is not limited (i.e. the digital display of the directional headings may be continuous, i.e.

through the time when the second internal field is generated). In the preferred embodiment, the first internal field is generated by a rotor of a stepping motor being in a first orientation, and the at least second internal field is generated by the rotor of the stepping motor being in a second orientation, wherein the method comprises the steps of determining whether the rotor is in the first orientation before measuring the external field; and if not, causing the rotor to rotate into the first orientation prior to measuring the external field.

BRIEF DESCRIPTION OF THE DRAWINGS

For a fuller understanding of the invention, reference is had to the following description taken in connection with the accompanying figures, in which.

DETAILED DESCRIPTION OF THE PREFERRED EMBODIMENTS

While the present invention is generally directed to electronic devices that produce or encounter predictable and/or internally generated signals, the present invention is particularly directed to an improved method of more accurately compensating for such predictable and/or internally generated signals in an electronic device, such as a timepiece and a watch in particular. More specifically, the present invention is directed to electronic devices that include a "compass mode" in which the device can receive and display directional headings via a sensor coupled to the device (either internally or externally), and a method of more accurately determining such directional headings in timepieces that include one or more stepper motors. Specifically, as will become apparent below, in such timepieces, the rotor orientation produces differing magnetic fields, and, if not accurately compensated for while the electronic device is in the "compass mode," can significantly affect the directional heading readings.

Even more specifically, the present invention is directed to electronic devices of the previous paragraph that includes a compass mode as defined above. Generally speaking, such compass modes are well known and have been incorporated into the aforementioned "all digital" timepieces, such as those manufactured and sold by the assignee of the present invention under the Timex and Expedition brand names. Accordingly, it should be understood that compass ASICs (hereinafter "ASIC" or "ASICs") to perform such directional heading readings are well known in the industry, and the particular construction thereof is not material to the invention.

Furthermore, although one skilled in the art will readily appreciate that the present invention is applicable to electronic devices with a plurality of stepping motors, the preferred embodiment of the electronic device comprises only one stepper motor, which steps the second hand as will be disclosed herein. Accordingly, reference to "the rotor" and/or "the stepper motor" should be understood to be the rotor and/or the motor for driving the gear train for rotating the second hand, if available, and thus the minute and hour hand, in a known manner. However, the present invention, in its broadest application, should not be limited thereby.

Figure 1:
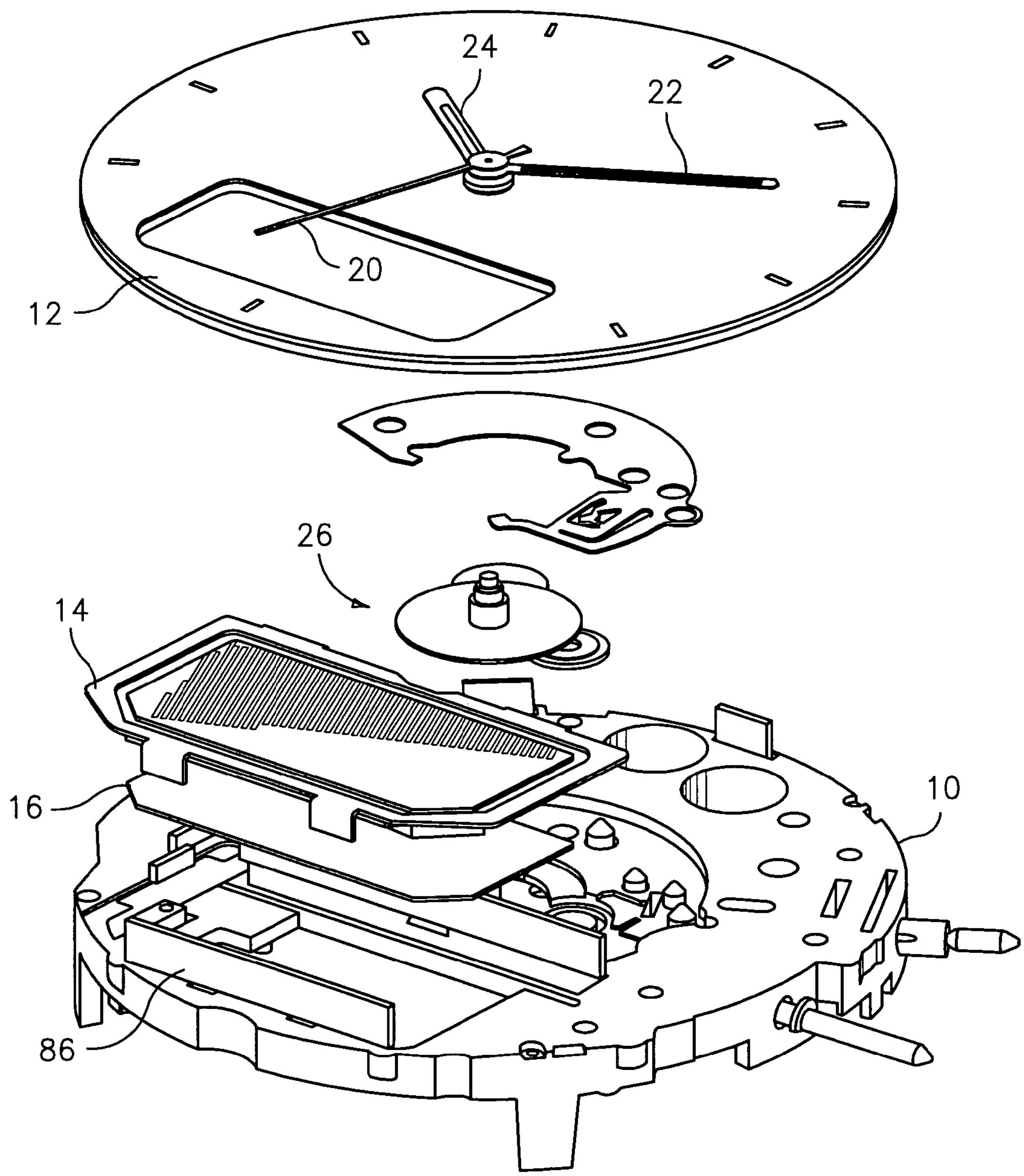
FIGS. 1 and 2 are exploded views of the dial side and movement side, respectively, of the construction of a preferred electronic device that incorporates the present invention.
Figure 2:
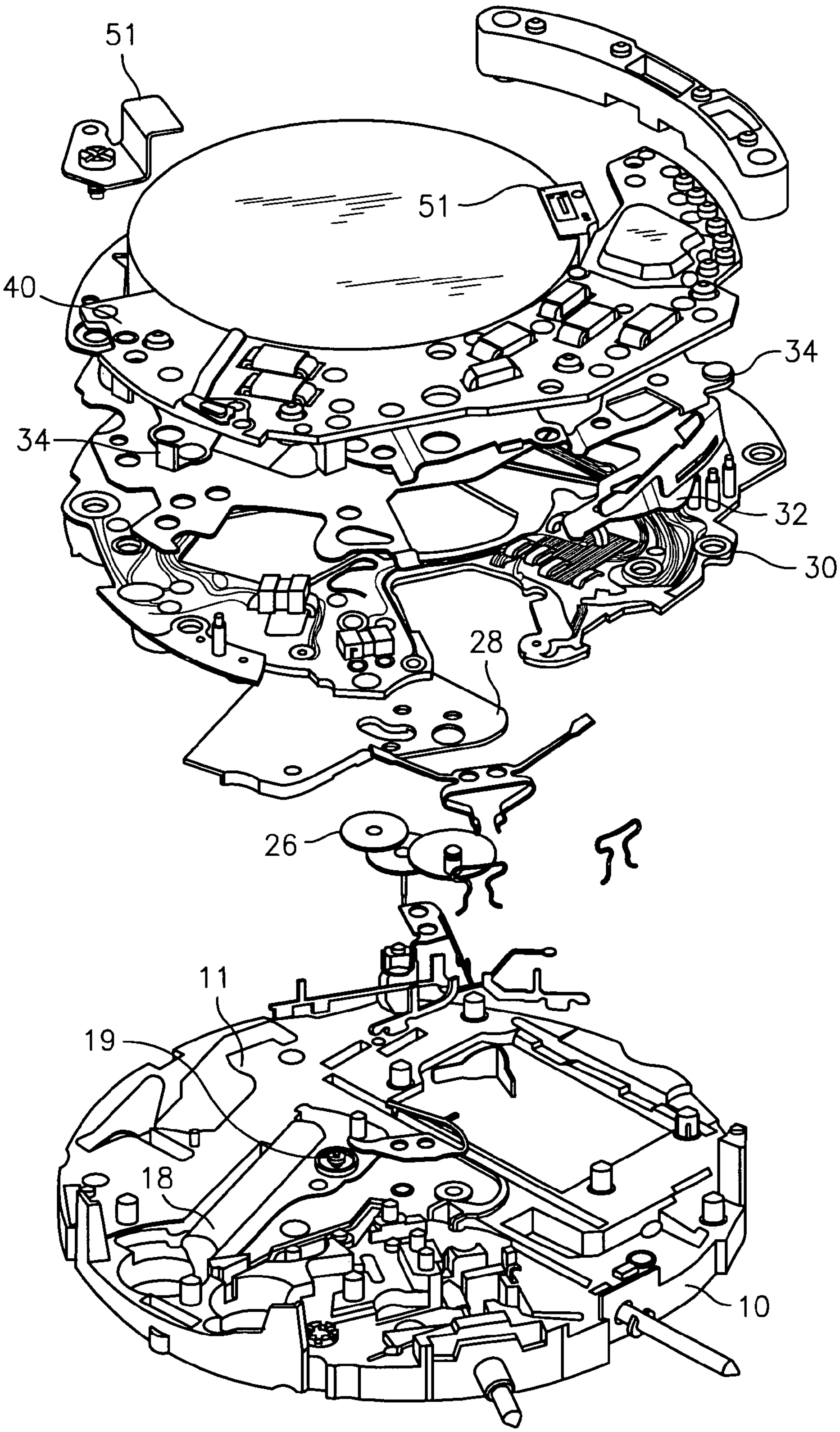

Reference is thus briefly made to FIGS. 1 and 2 for a disclosure of the preferred embodiment that incorporates the methodology of the present invention, although further details of the construction of FIGS. 1 and 2 are more particularly set forth in U.S. application Ser. No. 60/474,180 (entitled "Multifunctional Timepiece Module With Application Specific Printed Circuit Boards" by inventors Louis Galie, et al., and having been filed on this May 29, 2003) the subject matter of this application being incorporated by reference as if fully set forth herein.

Specifically, FIGS. 1 and 2 illustrate a module, generally indicated at 1. Module 1 is part of a timepiece and a watch in particular, the straps and casing of which is not shown here for purposes of brevity, but which is shown in the aforementioned "Multifunctional Timepiece Module With Application Specific Printed Circuit Boards" application as FIG. 7 and incorporated by reference herein. However, reference may be made herein to a timepiece and/or watch, and is intended to mean the device that includes module 1.

Relevant to the present invention is that module 1 includes one stepper motor, generally indicated at 18, which itself includes a rotor 19. Rotor 19 drives a gear train, generally indicated at 26, which in turn rotates second hand 20, which in turn causes the rotation of the minute hand and hour hand, all of which should be well understood by one skilled in the art.

Moreover, the rotation of rotor 19 of stepper motor 18 is under microprocessor control, all of which should also be well known to one skilled in the art. For reference, one may wish to review copending and coowned U.S. application Ser. No. 10/090,588 or 10/441,417, for a complete understanding of controlling and driving one or more stepper motors. Accordingly, the subject matters these U.S. application Ser. Nos. 10/090,588 and 10/441,417 are also incorporated by reference as if fully set forth herein.

As should now be appreciated from the foregoing, the magnetic fields created by the rotor 19 being in one of at least two orientations (typically, in a Lavet type stepping motor that makes two (2) steps per 360°, the rotor will be orientated in one of two positions, each being 180° out of phase with the other) can adversely affect directional heading readings taken by the compass ASIC, which in turn will adversely affect the accuracy of the displayed directional headings in an analog timepiece or other electronic device that includes a compass mode. In the preferred embodiment, the display of the directional headings is provided on an LCD display 14 (FIG. 1). The compass ASIC is mounted on printed circuit board 40.

Accordingly, for use in such electronic devices that include a compass mode and one or more of such stepper motors, the present invention is directed to a method of ensuring that such directional heading readings are performed while the rotor is in a specific (and always the same) orientation. In this way, once the magnetic field created by the rotor is taken into account during a calibration mode, each successive actuation of the compass mode will be able to provide for accurate directional heading readings, since the magnetic field of the rotor will be of a known quantity and direction, thus being able to be always and accurately offset from the actual directional heading readings.

Therefore, whenever directional headings are to be taken by the ASIC, it is desirable that the rotor always be in the same position as it was when calibration was performed. Moreover, while possible, it is not desirable to delay (i.e. for one second, for example) the directional heading readings until the rotor rotates in the position for which calibration was made, nor is it desirable to take and display directional heading readings only over a very short duration, i.e. less than a second (e.g. a "single-shot" compass reading). On the contrary, what is desirable, and achieved by the present invention, is the ability to both take and display current directional heading readings as soon as possible after the user requests such directional heading information, and thereafter, for an extended period, continue to take and display such directional heading readings. For example, in a preferred method, the extended period during which directional headings are taken and displayed, may be fifteen (15) seconds, although, as will become clear below, this is by example and not limitation, as the duration is only a matter of design choice, since the preferred methodology of the present invention is not dependent thereon.

Specifically, after the first heading is taken, and the data is sent to the processing and display software, this processing software sets a timer for a predetermined length of time (e.g. 1 second). When this timer expires, the software then requests that another sample be taken by setting a flag, and activating the interrupt which is used to read the compass ASIC. This would then re-activate the compass sampling software which would read the ASIC and clear the flag to indicate data was read. This sequence allows samples to be processed and displayed at a 1 Hz rate for as long as there flag is reset (in this case 15 seconds). However, if a faster update was desired, the processing and display software could set the timer for a shorter duration (e.g. 0.5 seconds), and set the flag when this shorter timer expires. In this case, the update rate would be 2 Hz. By this method, the compass data can be sampled and the display updated at any desired rate.

Generally speaking, the present invention is achieved by, among other things, ensuring that the microcontroller "knows" the orientation of the rotor. Firstly, using the convention discussed in the next paragraph, calibration is effected by arbitrarily designating one orientation of the rotor motion as the "good" orientation. Moreover, the way the microcontroller "knows" the orientation of the rotor is by the signal the microcontroller sends to make the rotor rotate. There are two sets of signals that drive the rotor, one signal set drives the motor from "bad-to-good", and another drives it from "good-to-bad". If successive "good-to-bad" signals are sent after a preceding first "good-to-bad" signal, the rotor will not rotate anymore. Conversely, successive "bad-to-good" signals after a preceding first "bad-to-good" signal will also produce no further rotor movement. Thus, the microcontroller has to keep track of what signal it has just sent to make the rotor move so it can send the correct next signal.

Moreover, the microcontroller must maintain the orientation of the rotor both when the electronic device first enters the compass mode, and while in the compass mode. Briefly stated, the following convention will be used. Namely, if the rotor is in the orientation for which the magnetic field was taken into account during calibration, this rotor orientation will be coined the "good" orientation. On the other hand, if the rotor is in the opposite orientation, such orientation will be coined the "bad" orientation. Preferably, directional heading readings are only taken when the rotor is in the "good" orientation. Since there is always the likelihood that the compass mode will be entered when the rotor is in the "bad" orientation (and of course, each second the rotor of the stepper motor will rotate into the "bad" orientation), some methodology needs to be provided, and is provided herein, to continually "force" the rotor ahead to the "good" orientation where the aforementioned accurate directional heading readings can be taken. Of course, all this needs to be performed under the strict control of the microprocessor since the analog time must be accurately maintained, notwithstanding the fact that the rotor may be "forced" ahead while in the compass mode.

Thus, in accordance with the preferred embodiment, where "continuous" directional heading readings are taken (i.e., the ASIC is read at a relatively high rate on a sampled basis to simulate continuous operation), when the rotor rotates into the "bad" orientation (i.e. the position where it is not desirable to perform directional headings readings), the rotor will be "forced" 180° ahead to the "good" orientation (i.e. the position where it is desirable to perform directional headings readings). When the compass reading is completed, the microprocessor will determine whether the display of the analog time is ahead of the actual time, and if so, will delay the rotation of the rotor as set forth below. In this way, the accuracy of the analog display of time can be maintained.

In a particular embodiment where a digital display is provided such as in the present "combo" watch embodiment of FIGS. 1 and 2, it should be understood that the digital TOD will always be accurate (i.e. entering or being in the compass mode having no affect on any digital display of TOD).

Thus, what a user will see while the device is in the compass mode, as will become clearer below, is the second hand of the analog display moving in two second increments, i.e. moving two positions every other second, and not moving at all on the seconds between the two second increments.

While not necessarily material to enabling the present invention, the following is provided to alert the ordinarily skilled artisan of typical constraints that may be encountered when implementing the present invention in an electronic device, such as a watch.

Specifically, it is assumed that the rotor driving the second hand is unidirectional, and thus can only be advanced. Secondly, the rotor can only move one position per 31.25 ms, meaning the rotor cannot be advanced any faster than 32 steps per second, i.e., 16 revolutions per second. Thirdly, the ASIC is activated by the microprocessor, samples the magnetic field, and transmits this sample (data) to the microprocessor only when the rotor is at rest.

Figure 3:
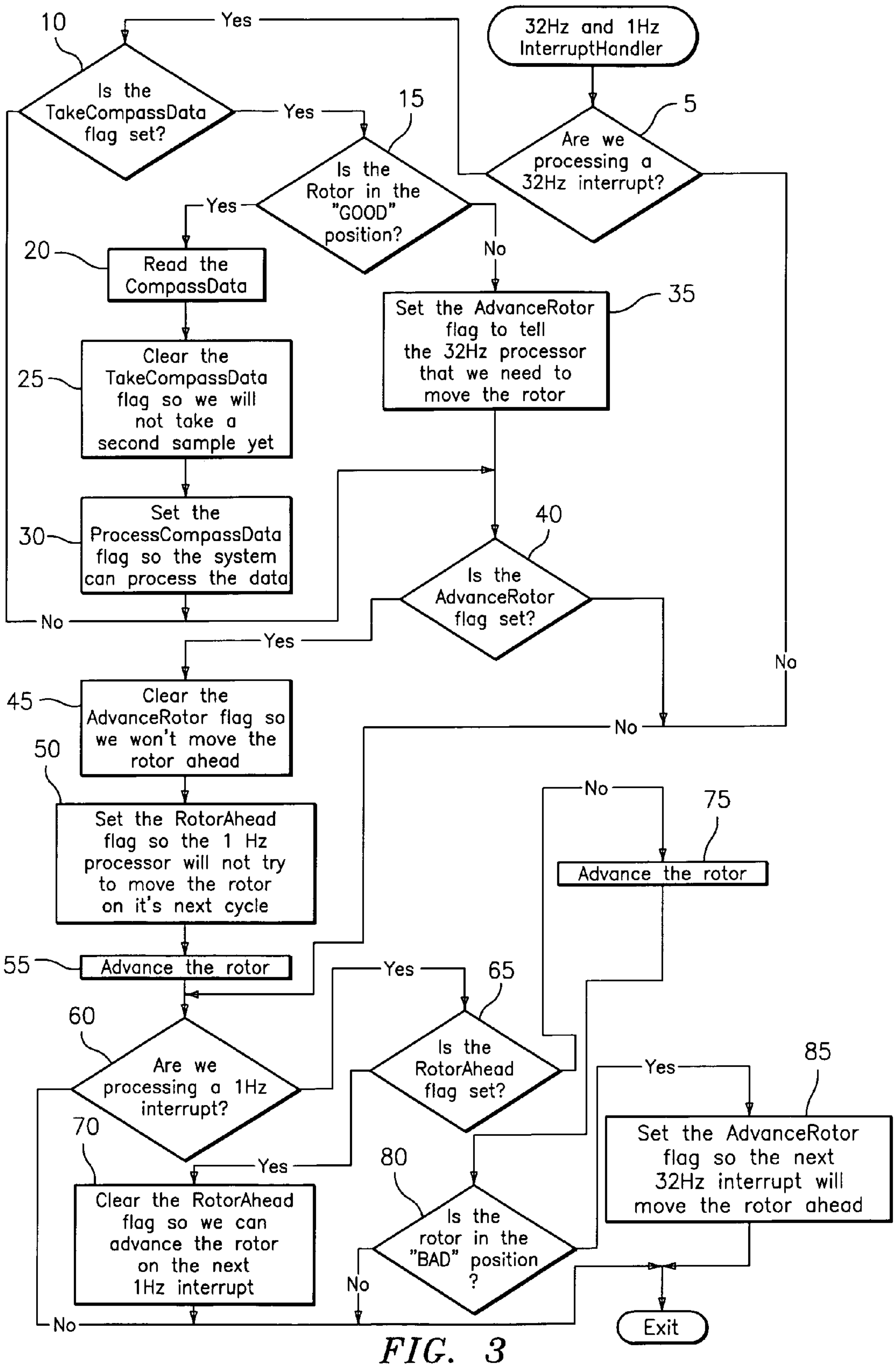
FIG. 3 is a flow chart of a preferred method of more accurately taking directional heading readings in an electronic device, such as a timepiece in general and a watch in particular, that includes one or more stepper motors.

The rotor will be advanced using only the 1 Hz or 32 Hz interrupt (see FIG. 3). If both interrupts occur simultaneously, only one rotor advancement will be allowed, and the ASIC will be read only on the 32 Hz interrupt when the motor is in the "good" orientation. The ASIC will be read only in the Interrupt Service Routine of FIG. 3, as this takes only 10–15 msecs, and it is preferable that the ASIC is read as soon as the rotor is in the correct (i.e. "good") orientation.

The preferred methodology requires that certain variables are tracked, and they are appropriate labeled in FIG. 3. Such variables, as will become clear below, assist in tracking the orientation of the rotor, the accuracy of the analog time (e.g. was the rotor prematurely advanced to place it in the "good" orientation thus making the analog TOD ahead of the "true accurate time" and/or that which is correspondingly displayed on the LCD), whether and when the rotor needs to be rotated ahead 180°, and whether data is needed from the ASIC. For example:

1. "TakeCompassData" flag Setting this flag instructs the microcontroller to retrieve a directional heading reading from the ASIC during a 32 Hz Interrupt. If this flag is cleared, the ASIC is not read. This flag may be set by the application to start sampling or during the reading of the ASIC routine in continuous mode when the correct time slot has been reached to sample the ASIC.

2. "AdvanceRotor" flag If this flag is set, the rotor must be advanced 180° during a 32 Hz Interrupt and before the ASIC is read.
3. "RotorAhead" flag This flag being set indicates that analog TOD time is ahead of the actual time by one second. The flag is set whenever the rotor is advanced during the 32 Hz Interrupt portion of FIG. 3.

All compass reading and motor movements occur in the Interrupt Routine of FIG. 3.

Reference is now made to FIG. 3, which illustrates the preferred methodology to carry out and achieve the aforementioned objectives.

At the beginning of the Interrupt Routine, control of the microprocessor passes to step 5, where it is determined whether a 32 Hz Interrupt is being processed. If it is not (i.e. the compass mode has not been actuated) it is determined whether it is time to advance second hand 20.

Assuming that the compass mode has been actuated, control passes to step 10, where it is determined whether the TakeCompassData flag is set. If it is set, a directional heading is to be read from the ASIC if the rotor is in the "good" orientation. Hence, control passes to step 15 where it is determined whether the rotor is in the "good" position.

If the rotor is in the "good" position, control passes to steps 20–30, where the directional heading from the ASIC is read (step 20), the TakeCompassData flag is cleared (step 25) so as to ensure that only one directional heading is taken, and the data retrieved from the ASIC is processed (step 30). If the flag wasn't cleared, every time the 32 Hz Interrupt was entered, a direction heading would be taken, whether one was desired or not.

In the preferred embodiment, the headings are displayed instantaneously since the sampling rate is low (once a second for headings).

On the other hand, if it is determined at step 15 that the rotor is in the "bad" orientation, control passes to step 35 wherein the AdvanceRotor flag is set so that the microprocessor knows that the rotor must be advanced 180° before data is read from the ASIC.

From step 30 or step 35, control passes to steps 40 where it is determined if the AdvanceRotor flag has been set. If it is set (i.e. the rotor must be advanced), control passes to steps 45–55 wherein the Advanced Rotor flag is then cleared so that the rotor is not thereafter advanced again (step 45), the RotorAhead flag is set so that the microprocessor will not attempt to rotate the rotor on its next cycle (step 50) and the rotor is advanced to the "good" orientation (step 55).

If it were determined at step 40 that the AdvanceRotor flag was not set, control would immediately pass to step 60. For completeness, it can be seen that control also passes to step 60 after the rotor was advanced in step 55.

At step 60 it is determined whether the 1 Hz Interrupt is being processed where if appropriate, the second hand would be rotating in its normal TOD mode. If not, control passes to the end of the Interrupt Service Routine and back to the main processing software (i.e., the watch's operating system, or core software).

At step 60, it is determined if one second has elapsed and if the Time of Day must be interrupted. At this point, if a 1 Hz Interrupt is being processed, the digital TOD would be updated. Therefore, if it is determined at step 60 that the rotor needs to be advanced, control passes to step 65 wherein it is determined whether the RotorAhead flag has been set thus indicating that the analog time is ahead of the correct time by one second. If the RotorAhead flag is set, control passes to step 70 wherein the RotorAhead flag is cleared so that when control is again passed to step 65, control will pass to step 75 where the rotor will be advanced. Importantly, control having been passed to step 70 from step 65 indicates that although the rotor was to be advanced because of the 1 Hz Interrupt, since the rotor was already previously forced ahead one 180° rotation it is actually now at the correct position and the analog displayed time is correct.

On the other hand, if it is determined at step 65 that the analog time is correct (but there is a signal to rotate the rotor), then control does properly pass to step 75 where the rotor is advanced 180°. Control then passes to step 80 wherein it is determined whether the rotor is in the "bad" orientation, and if so, control passes to step 85 wherein the AdvanceRotor flag is again set so that at the next 32 Hz Interrupt, the rotor will be advanced 180°.

It can thus be seen that the present invention provide a method for more accurately taking directional heading readings in an electronic device that includes a compass mode, such as in timepieces in general and watches in particular, that includes one or more stepper motors. Moreover, the present invention achieves the foregoing all while displaying them to a user, such as on an LCD display. Still further, the present invention provides and displays such directional heading readings while continuously maintaining and displaying at least essentially accurate timekeeping, and further provides a methodology to ensure that accurate timekeeping is returned to the analog display component of the device.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

Finally, it should be well appreciated that the present invention is well suited for a wide variety of electronic devices. Therefore, while the present disclosure provides its preferred embodiment as being a timepiece in general and a watch in particular, the invention should not be deemed to be so limited. That is, it should be clear that any electronic device that could utilize the present invention is intended to be covered hereby.

What is claimed is:

1. In an electronic device, a method of measuring an external field and displaying indicia related to the measurement, wherein the electronic device generates a first internal field by a rotor of a stepping motor for displaying time being in a first orientation and at least a second internal field by the rotor of the stepping motor for displaying time being in a second orientation, wherein the method comprises the steps of:

measuring the external field when the electronic device is generating the first internal field; and only displaying indicia related to measurements taken while the electronic device is generating the first internal field; and wherein the first and second orientations of the rotor are 180° out of phase.

2. The method as claimed in claim 1, including the step of:

calibrating the electronic device by measuring or determining the first internal field, wherein the measured or determined first internal field is offset from the measured external field prior to displaying indicia related to the measured external field.

3. The method as claimed in claim 1, wherein the method comprises the steps of:

determining whether the rotor is in the first orientation before measuring the external field and if so, measuring the external field; and if not, causing the rotor to rotate into the first orientation prior to measuring the external field.

4. The method as claimed in claim 3, wherein the rotor is rotatable from the first orientation to the second orientation in a predetermined period and is further rotatable from the second orientation to the first orientation in the predetermined period, wherein the method comprises the steps of:

causing the rotor to be rotated from the second orientation into the first orientation in a period that is less than the predetermined period.

5. The method as claimed in claim 4, including the steps of:

determining whether the rotor was caused to be rotated from the second orientation into the first orientation in the period that is less than the predetermined period; and if so:

not rotating the rotor until the next predetermined period.

6. The method as claimed in claim 5, wherein the predetermined period is at least essentially one second.

7. An electronic device for measuring an external field and displaying indicia related to the measurement, the electronic device comprising:

means for generating a first internal field by a rotor of a stepping motor for displaying time being in a first orientation and at least a second internal field by the rotor of the stepping motor being in a second orientation;

means for measuring the external field when the electronic device is generating the first internal field; and means for displaying only indicia related to measurements taken while the electronic device is generating the first internal field;

wherein the first and second orientations of the rotor are 180° out of phase.

8. The electronic device as claimed in claim 7, comprising:

means for calibrating the electronic device by measuring or determining the first internal field, wherein the measured or determined first internal field is offset from the measured external field prior to displaying indicia related to the measured external field.

9. The electronic device as claimed in claim 7, wherein the means for generating the first internal field comprises a rotor of a stepping motor being in a first orientation, and wherein the means for generating the at least second internal field is generated by the rotor of the stepping motor being in a second orientation, wherein the electronic device comprises:

means for determining whether the rotor is in the first orientation before measuring the external field and if so, for measuring the external field; and if not, for causing the rotor to rotate into the first orientation prior to measuring the external field.

10. The electronic device as claimed in claim 9, wherein the rotor is rotatable from the first orientation to the second orientation in a predetermined period and is further rotatable from the second orientation to the first orientation in the predetermined period, wherein the electronic device causes the rotor to be rotated from the second orientation into the first orientation in a period that is less than the predetermined period.

11. The electronic device as claimed in claim 10, comprising:

means for determining whether the rotor was caused to be rotated from the second orientation into the first orientation in the period that is less than the predetermined period; and if so, for inhibiting rotating of the rotor until the next predetermined period.

12. The electronic device as claimed in claim 11, wherein the electronic device is a timepiece and the external field is a magnetic field.

13. The electronic device as claimed in claim 9, including an LCD for displaying indicia related to the measurement, and wherein the stepping motor is operatively coupled to display hands for displaying time information.

14. The electronic device as claimed in claim 7, wherein the electronic device is a timepiece and the external field is a magnetic field.

* * * * *